(12) United States Patent
Que et al.

(10) Patent No.: US 8,531,624 B2
(45) Date of Patent: Sep. 10, 2013

(54) LCD DEVICE

(75) Inventors: Chengwen Que, Shenzhen (CN); Yu-Chun Hsiao, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 93 days.

(21) Appl. No.: 13/318,148

(22) PCT Filed: Jun. 8, 2011

(86) PCT No.: PCT/CN2011/075467
§ 371 (c)(1),
(2), (4) Date: Oct. 30, 2011

(87) PCT Pub. No.: WO2012/151770
PCT Pub. Date: Nov. 15, 2012

(65) Prior Publication Data
US 2012/0287368 A1   Nov. 15, 2012

(30) Foreign Application Priority Data
May 10, 2011 (CN) .................. 2011 2 0146823 U

(51) Int. Cl.
*G02F 1/1333* (2006.01)
(52) U.S. Cl.
USPC ............................. 349/58; 349/61
(58) Field of Classification Search
None
See application file for complete search history.

(56) References Cited

U.S. PATENT DOCUMENTS

2001/0019377 A1* 9/2001 Fukayama et al. ............ 349/58
2003/0128307 A1* 7/2003 Ito et al. ........................ 349/58

* cited by examiner

*Primary Examiner* — Lucy Chien
(74) *Attorney, Agent, or Firm* — Cheng-Ju Chiang

(57) ABSTRACT

The present invention provides a liquid crystal display (LCD) device and a back cover thereof. The LCD device comprises a liquid crystal panel, a back cover, a light guide plate and a light source. The back cover comprises a first sidewall, a second sidewall, a first supporting wall and a second supporting wall. The first sidewall and the second sidewall are spaced apart from each other to form a receiving space. The first supporting wall connects an end of the first sidewall and an end of the second sidewall. The second supporting wall extends away from the second sidewall and connects to the other end of the first sidewall. The liquid crystal panel is supported on a side of the first supporting wall that faces away from the first sidewall and the second sidewall. The light guide plate is supported on a side of the second supporting wall that faces towards the liquid crystal panel. The light source is disposed inside the receiving space. The first sidewall is formed with a through-hole for allowing light rays generated by the light source to pass therethrough into the light guide plate. With the aforesaid arrangement, the metal backplate and the plastic mid-frame used in the prior art LCD device can be replaced by the back cover to simplify the structure and lower the production cost of the LCD device.

14 Claims, 1 Drawing Sheet

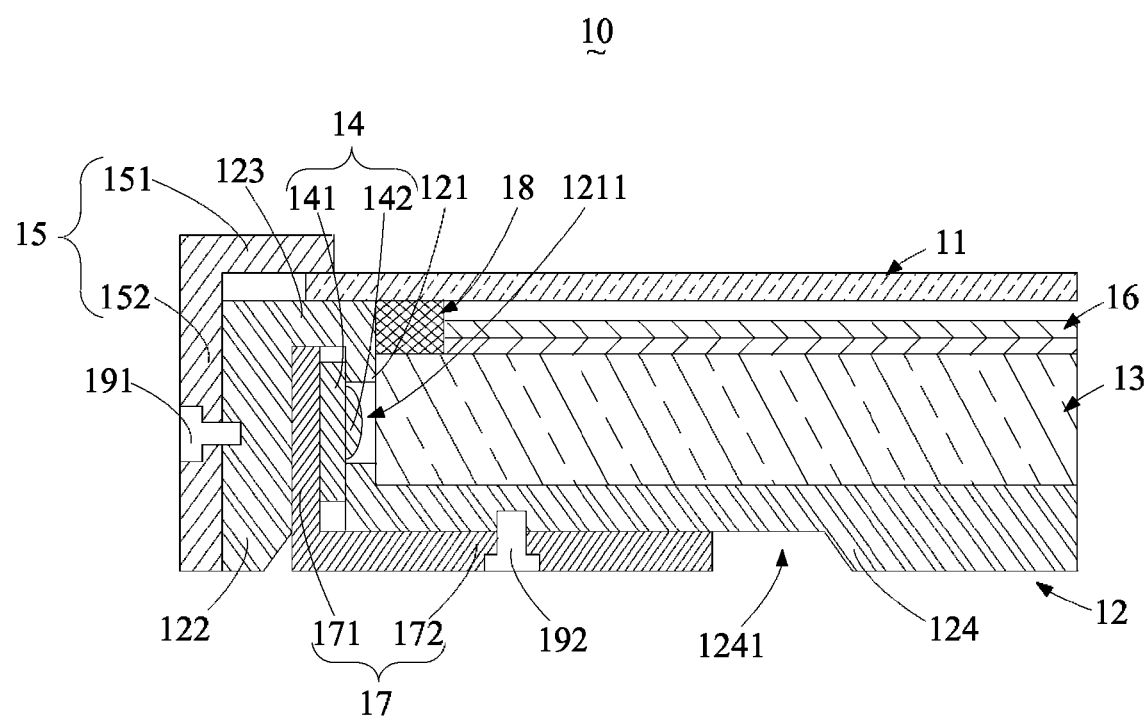

LCD DEVICE

TECHNICAL FIELD

The present invention generally relates to the field of liquid crystal displays (LCDs), and more particularly, to an LCD device and a back cover thereof.

BACKGROUND

Nowadays, owing to such advantages as lightweight, low-profile, low power consumption and free of radiation, liquid crystal displays (LCDs) have found wide application in various electronic products such as computers, TV sets, notebook computers, mobile phones and digital cameras. A typical LCD device in the prior art comprises a liquid crystal panel, a light source, a light guide plate, an optical membrane, a reflective sheet, a plastic mid-frame, a metal backplate and a front frame. The light guide plate, the optical membrane, the reflective sheet and the light source are disposed in a receiving space formed by the plastic mid-frame and the metal backplate, and are fixed therein by the plastic mid-frame. The liquid crystal panel is disposed on an upper surface of the plastic mid-frame and fixed by the front frame and the plastic mid-frame.

Therefore, the prior art LCD device requires use of the plastic mid-frame, the metal backplate and the front frame in combination to fix other components, which makes the LCD device complex in structure and have a high production cost.

What is needed, therefore, is an LCD device and a back cover thereof that can solve the problems that the prior art LCD devices are complex in structure and have a high production cost.

SUMMARY OF THE INVENTION

The primary objective of the present invention is to provide a liquid crystal display (LCD) device and a back cover thereof which can reduce the structural complexity and the production cost of the LCD device.

To achieve this objective, the present invention provides a liquid crystal display (LCD) device, comprising: a liquid crystal panel extending in a first direction; a back cover, comprising a first sidewall, a second sidewall, a first supporting wall and a second supporting wall, wherein the first sidewall and the second sidewall extend in a second direction perpendicular to the first direction and are spaced apart from each other to form a receiving space, the first sidewall is located more inward of the LCD device than the second sidewall, the first supporting wall extends in the first direction and connects an end of the first sidewall and an end of the second sidewall that face toward the LCD panel, the second supporting wall extends away from the second sidewall in the first direction and connects to the other end of the first sidewall that faces away from the liquid crystal panel, and the liquid crystal panel is supported on a side of the first supporting wall that faces away from the first sidewall and the second sidewall; a front frame, comprising a third sidewall and a fourth sidewall connected with each other, wherein the third sidewall extends in the first direction and presses the liquid crystal panel, and the fourth sidewall extends in the second direction and is located more outward of the LCD device than the second sidewall; a light guide plate, being supported on a side of the second supporting wall that faces towards the liquid crystal panel; a buffering element, being disposed adjacent to the first sidewall and supported between the liquid crystal panel and the light guide plate; and a light source, being disposed inside the receiving space, wherein the first sidewall is formed with a through-hole for allowing light rays generated by the light source to pass therethrough into the light guide plate.

According to a preferred embodiment of the present invention, the fourth sidewall is fixed to the second sidewall.

According to a preferred embodiment of the present invention, the light source comprises a light source substrate and a light emitting element disposed on the light source substrate, the LCD device further comprises a heat dissipating plate having a fifth sidewall and a sixth sidewall connected with each other, the fifth sidewall extends in the second direction, the light source substrate is fixed to the fifth sidewall, and the sixth sidewall extends in the first direction and is fixed on a side of the second supporting wall that faces away from the liquid crystal panel.

According to a preferred embodiment of the present invention, a recess for receiving the sixth sidewall is formed on a side of the second supporting wall that faces away from the liquid crystal panel.

According to a preferred embodiment of the present invention, the LCD device further comprises an optical membrane disposed on a side of the light guide plate that faces towards the liquid crystal panel.

According to a preferred embodiment of the present invention, a reflective layer is disposed on a side of the second supporting wall that faces towards the liquid crystal panel.

According to a preferred embodiment of the present invention, the reflective layer is a reflective coating or a reflective sheet.

The present invention further provides an LCD device, comprising: a liquid crystal panel extending in a first direction; a back cover, comprising a first sidewall, a second sidewall, a first supporting wall and a second supporting wall, wherein the first sidewall and the second sidewall extend in a second direction perpendicular to the first direction and are spaced apart from each other to form a receiving space, the first sidewall is located more inward of the LCD device than the second sidewall, the first supporting wall extends in the first direction and connects an end of the first sidewall and an end of the second sidewall that face toward the LCD panel, the second supporting wall extends away from the second sidewall in the first direction and connects to the other end of the first sidewall that faces away from the liquid crystal panel, and the liquid crystal panel is supported on a side of the first supporting wall that faces away from the first sidewall and the second sidewall; a light guide plate, being supported on a side of the second supporting wall that faces towards the liquid crystal panel; and a light source, being disposed inside the receiving space, wherein the first sidewall is formed with a through-hole for allowing light rays generated by the light source to pass therethrough into the light guide plate.

According to a preferred embodiment of the present invention, the LCD device further comprises a front frame, wherein the front frame comprises a third sidewall and a fourth sidewall connected with each other, the third sidewall extends in the first direction and presses the liquid crystal panel, and the fourth sidewall extends in the second direction and is located more outward of the LCD device than the second sidewall.

According to a preferred embodiment of the present invention, the fourth sidewall is fixed to the second sidewall.

According to a preferred embodiment of the present invention, the light source comprises a light source substrate and a light emitting element disposed on the light source substrate, the LCD device further comprises a heat dissipating plate having a fifth sidewall and a sixth sidewall connected with each other, the fifth sidewall extends in the second direction, the light source substrate is fixed to the fifth sidewall, and the sixth sidewall extends in the first direction and is fixed on a side of the second supporting wall that faces away from the liquid crystal panel.

According to a preferred embodiment of the present invention, a recess for receiving the sixth sidewall is formed on a side of the second supporting wall that faces away from the liquid crystal panel.

According to a preferred embodiment of the present invention, the LCD device further comprises a buffering element that is disposed adjacent to the first sidewall and supported between the liquid crystal panel and the light guide plate.

According to a preferred embodiment of the present invention, the LCD device further comprises an optical membrane disposed on a side of the light guide plate that faces towards the liquid crystal panel.

According to a preferred embodiment of the present invention, a reflective layer is disposed on a side of the second supporting wall that faces towards the liquid crystal panel.

According to a preferred embodiment of the present invention, the reflective layer is a reflective coating or a reflective sheet.

The present invention further provides a back cover of an LCD device, wherein the back cover comprises a first sidewall, a second sidewall, a first supporting wall and a second supporting wall, the first sidewall and the second sidewall are spaced apart from each other to form a receiving space, the first supporting wall connects an end of the first sidewall and an end of the second sidewall, the second supporting wall connects to the other end of the first sidewall and extends away from the second sidewall, and the first sidewall is formed with a through-hole thereon.

According to a preferred embodiment of the present invention, a reflective layer is disposed on a side of the second supporting wall that faces towards the liquid crystal panel.

According to a preferred embodiment of the present invention, the reflective layer is a reflective coating or a reflective sheet.

The present invention has the following benefits: as compared to the prior art, the LCD device of the present invention uses the back cover to replace the metal backplate and the plastic mid-frame of the prior art LCD device. Because this reduces the structural complexity and the production cost of the LCD device, the assembling process of the LCD device is simplified and the competitive edge of the manufacturers is improved.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

The FIGURE shows a schematic cross-sectional view of a preferred embodiment of an LCD device according to the present invention.

DETAILED DESCRIPTION OF EMBODIMENTS

Reference will now be made to the drawings to describe preferred and exemplary embodiments of the present invention in detail.

Referring to the FIGURE, there is shown a schematic cross-sectional view of a preferred embodiment of an LCD device according to the present invention. An LCD device 10 of the present invention comprises a liquid crystal panel 11, a back cover 12, a light guide plate 13, a light source 14, a front frame 15, an optical membrane 16, a heat dissipating plate 17 and a buffering element 18.

In this embodiment, the liquid crystal panel 11 extends in a first direction. In the FIGURE, the first direction is of a horizontal direction. However, it will be appreciated by those skilled in the art that, when the LCD device 10 is put in other orientations, the first direction may also be other directions.

In this embodiment, the back cover 12 comprises a first sidewall 121, a second sidewall 122, a first supporting wall 123 and a second supporting wall 124. The first sidewall 121 and the second sidewall 122 extend in a second direction perpendicular to the first direction. The first sidewall 121 is located more inward of the LCD device 10 than the second sidewall 122, and is spaced apart from the second sidewall 122 to form a receiving space. The first sidewall 121 is further formed with a through-hole 1211. The first supporting wall 123 extends in the first direction and connects an end of the first sidewall 121 and an end of the second sidewall 122 that face towards the liquid crystal panel 11 so that the liquid crystal panel 11 can be supported on a side of the first supporting wall 123 that faces away from the first sidewall 121 and the second sidewall 122. The second supporting wall 124 extends away from the second sidewall 122 in the first direction, and connects to the other end of the first sidewall 121 that is away from the liquid crystal panel 11. In this embodiment, the first sidewall 121, the second sidewall 122, the first supporting wall 123 and the second supporting wall 124 of the back cover 12 are preferably formed integrally through injection molding. In other embodiments, the first sidewall 121, the second sidewall 122, the first supporting wall 123 and the second supporting wall 124 of the back cover 12 may also be formed integrally by punching a metal sheet or be assembled from a plurality of separate components.

In this embodiment, the front frame 15 comprises a third sidewall 151 and a fourth sidewall 152 connected with each other. The third sidewall 151 extends in the first direction and presses the liquid crystal panel 11, and the fourth sidewall 152 extends in the second direction and is located more outward of the LCD device 10 than the second sidewall 122. By fixing the fourth sidewall 152 to the second sidewall 122 by a screw 191, the front frame 15 is fixed to the back cover 12 so that the liquid crystal panel 11 is sandwiched and, consequently, fixed between the third sidewall 151 of the front frame 15 and the first supporting wall 123 of the back cover 12. In other embodiments, the front wall 15 may be fixed to the back cover 12 in other ways, for example, through snap-fitting or adhesion.

In this embodiment, the light guide plate 13 is supported on a side of the second supporting wall 124 that faces towards the liquid crystal panel 11. The buffering element 18 is disposed adjacent to the first sidewall 121 and supported between the liquid crystal panel 11 and the light guide plate 13. Thus, via the buffering element 18, the liquid crystal 11 presses the light guide plate 13 against the second supporting wall 124 to position the light guide plate 13. In a preferred embodiment, the buffering element 18 may be made of rubber or some other buffering material. In other embodiments, the light guide plate 13 may be fixed to the second supporting wall 124 by means of other fixing structures, for example, by means of a positioning structure such as a positioning post or a positioning frame integrally formed with the second supporting wall 124 or by means of a fixing element such as a rivet, a riveting post or a screw.

In this embodiment, the optical membrane 16 is disposed on a side of the light guide plate 13 that faces towards the liquid crystal panel 11. The buffering element 18 abuts against an end of the optical membrane 16 to position the optical membrane 16. In other embodiments, the buffering element 18 can press the optical membrane 16 against the light guide plate 13 for purpose of positioning the optical membrane 16. In other embodiments, the optical membrane 16 may be fixed to the light guide plate 13 by means of other fixing structures, for example, by means of a positioning structure such as a positioning post or a positioning frame integrally formed with the light guide plate 13. The optical membrane 16 may be one or a combination of a diffusion film, a brightness enhancement film and an optical compensation film well known in the art.

In this embodiment, a reflective layer (not shown) is disposed on a side of the second supporting wall 124 that faces towards the liquid crystal panel 11. In a preferred embodiment, the reflective layer is a reflective coating or a reflective sheet. Additionally, the reflective effect may also be achieved by polishing a side of the second supporting wall 124 that faces towards the liquid crystal panel 11.

In this embodiment, the light source 14 is disposed in the receiving space defined by the first sidewall 121 and the second sidewall 122 so that light rays from the light source 14 propagates through the through-hole 1211 in the first sidewall 121 into the light guide plate 13. Specifically, the light source 14 comprises a light source substrate 141 and a light emitting element 142 disposed on the light source substrate 141. The light emitting element 142 may be a plurality of light emitting diodes (LEDs) or some other light source. A light coupling distance between the light source 14 and the light guide plate 13 may be controlled by setting a thickness of the first sidewall 121.

In this embodiment, the heat dissipating plate 17 comprises a fifth sidewall 171 and a sixth sidewall 172 connected with each other. The fifth sidewall 171 extends in the second direction and is disposed in the receiving space defined by the first sidewall 121 and the second sidewall 122 of the back cover 12. The light source substrate 141 is fixed onto the fifth sidewall 171 through adhesion or in other appropriate manner. The sixth sidewall 172 extends in the first direction, and is fixed to a side of the second supporting sidewall 124 that faces away from the liquid crystal panel 11. In this embodiment, a recess 1241 for receiving the sixth sidewall 172 is further formed on the side of the second supporting sidewall 124 that faces away from the liquid crystal panel 11 so that a side of the sixth sidewall 172 that faces away from the liquid crystal panel 11 and the side of the second supporting sidewall 124 that faces away from the liquid crystal panel 11 are in the same horizontal plane. It shall be noted that, in this embodiment, the light source 14 is fixed by means of the heat dissipating plate 17 and is disposed in the receiving space defined by the first sidewall 121 and the second sidewall 122. However, in other embodiments, the light source 14 may be fixed in other ways; for example, an appropriate supporting structure is disposed on the first sidewall 121 and the second sidewall 122 and the light source 14 is fixed to a withdrawable support that is slidable with respect to the supporting structure.

In the assembling process of the LCD device 10, firstly the light source substrate 141 of the light source 14 is fixed to the fifth sidewall 171 of the heat dissipating plate 17, and then the light source 14 and the fifth sidewall 171 are disposed into the receiving space defined by the first sidewall 121 and the second sidewall 122 of the back cover 12. Then, the sixth sidewall 172 is fixed into the recess 1241 of the second supporting wall 124 by means of a screw 192 or in other appropriate ways so that the heat dissipating plate 17 and the light source 14 are fixed to the back cover 12. Afterwards, the light guide plate 13 is supported on the second supporting wall 124, and the buffering element 18 and the optical membrane 16 are disposed on the light guide plate 13. Subsequently, the liquid crystal panel 11 is supported on the first supporting wall 123 and the buffering element 18. Finally, the third sidewall 151 of the front frame 15 is placed to press the liquid crystal panel 11, and the fourth sidewall 152 is fixed to the second sidewall 122 by means of a screw 191 or in other appropriate ways.

With the aforesaid arrangement, the LCD device of the present invention can use the back cover to replace the metal backplate and the plastic mid-frame of the prior art LCD device. Because this reduces the structural complexity and the production cost of the LCD device, the assembling process of the LCD device is simplified and the competitive edge of the manufacturers is improved.

It shall be noted that, the FIGURE only shows a schematic cross-sectional view of an end of the LCD device 10. Those skilled in the art will appreciate that, the same design may also be adopted at other ends of the LCD device 10 to allow for light incidence at two or more sides.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) device, comprising:
   a liquid crystal panel extending in a first direction;
   a back cover, comprising a first sidewall, a second sidewall, a first supporting wall and a second supporting wall, wherein the first sidewall and the second sidewall extend in a second direction perpendicular to the first direction and are spaced apart from each other to form a receiving space, the first sidewall is located more inward of the LCD device than the second sidewall, the first supporting wall extends in the first direction and connects an end of the first sidewall and an end of the second sidewall that face toward the LCD panel, the second supporting wall extends away from the second sidewall in the first direction and connects to the other end of the first sidewall that faces away from the liquid crystal panel, and the liquid crystal panel is supported on a side of the first supporting wall that faces away from the first sidewall and the second sidewall;
   a front frame, comprising a third sidewall and a fourth sidewall connected with each other, wherein the third sidewall extends in the first direction and presses the liquid crystal panel, and the fourth sidewall extends in the second direction and is located more outward of the LCD device than the second sidewall;
   a light guide plate, being supported on a side of the second supporting wall that faces towards the liquid crystal panel;
   a buffering element, being disposed adjacent to the first sidewall and supported between the liquid crystal panel and the light guide plate; and
   a light source, being disposed inside the receiving space, wherein the first sidewall is formed with a through-hole for allowing light rays generated by the light source to pass therethrough into the light guide plate;
   wherein the light source comprises a light source substrate and a light emitting element disposed on the light source substrate, the LCD device further comprises a heat dissipating plate having a fifth sidewall and a sixth sidewall connected with each other, the fifth sidewall extends in the second direction, the light source substrate is fixed to the fifth sidewall, and the sixth sidewall extends in the first direction and is fixed on a side of the second supporting wall that faces away from the liquid crystal panel.

2. The LCD device of claim 1, wherein the fourth sidewall is fixed to the second sidewall.

3. The LCD device of claim 1, wherein a recess for receiving the sixth sidewall is formed on a side of the second supporting wall that faces away from the liquid crystal panel.

4. The LCD device of claim 1, wherein the LCD device further comprises an optical membrane disposed on a side of the light guide plate that faces towards the liquid crystal panel.

5. The LCD device of claim 1, wherein a reflective layer is disposed on a side of the second supporting wall that faces towards the liquid crystal panel.

6. The LCD device of claim 5, wherein the reflective layer is a reflective coating or a reflective sheet.

7. A liquid crystal display (LCD) device, comprising:
   a liquid crystal panel extending in a first direction;
   a back cover, comprising a first sidewall, a second sidewall, a first supporting wall and a second supporting wall, wherein the first sidewall and the second sidewall extend in a second direction perpendicular to the first direction and are spaced apart from each other to form a receiving space, the first sidewall is located more inward of the LCD device than the second sidewall, the first supporting wall extends in the first direction and connects an end of the first sidewall and an end of the second sidewall that face toward the LCD panel, the second supporting wall extends away from the second sidewall in the first direction and connects to the other end of the first sidewall that faces away from the liquid crystal panel, and the liquid crystal panel is supported on a side of the first supporting wall that faces away from the first sidewall and the second sidewall;
   a light guide plate, being supported on a side of the second supporting wall that faces towards the liquid crystal panel; and
   a light source, being disposed inside the receiving space, wherein the first sidewall is formed with a through-hole for allowing light rays generated by the light source to pass therethrough into the light guide plate;
   wherein the light source comprises a light source substrate and a light emitting element disposed on the light source substrate, the LCD device further comprises a heat dissipating plate having a fifth sidewall and a sixth sidewall connected with each other, the fifth sidewall extends in the second direction, the light source substrate is fixed to the fifth sidewall, and the sixth sidewall extends in the first direction and is fixed on a side of the second supporting wall that faces away from the liquid crystal panel.

8. The LCD device of claim 7, further comprising a front frame, wherein the front frame comprises a third sidewall and a fourth sidewall connected with each other, the third sidewall extends in the first direction and presses the liquid crystal panel, and the fourth sidewall extends in the second direction and is located more outward of the LCD device than the second sidewall.

9. The LCD device of claim 8, wherein the fourth sidewall is fixed to the second sidewall.

10. The LCD device of claim 7, wherein a recess for receiving the sixth sidewall is formed on a side of the second supporting wall that faces away from the liquid crystal panel.

11. The LCD device of claim 7, further comprising a buffering element that is disposed adjacent to the first sidewall and supported between the liquid crystal panel and the light guide plate.

12. The LCD device of claim 7, wherein the LCD device further comprises an optical membrane disposed on a side of the light guide plate that faces towards the liquid crystal panel.

13. The LCD device of claim 7, wherein a reflective layer is disposed on a side of the second supporting wall that faces towards the liquid crystal panel.

14. The LCD device of claim 13, wherein the reflective layer is a reflective coating or a reflective sheet.

* * * * *